_2,981,334_
_Patented Apr. 25, 1961_

2,981,334

CONSOLIDATING PLASTIC COATED PARTICULATE SOLIDS

Hobart W. Powell, Jr., Tulsa, Okla., assignor to The Dow Chemical Company, Midland, Mich., a corporation of Delaware No Drawing. Filed Oct. 13, 1958, Ser. No. 766,702

6 Claims. (Cl. 166—12)

The invention relates to a resinous composition having improved setting properties and to a method of use thereof in the treatment of wells penetrating subterranean formations.

Float sand and dislodged bits of formation or detritus are often carried into a wellbore by the flow of the fluid being produced from the formation penetrated by the wellbore and there cause serious difficulties such as plugging, pump damage, and sediment in the fluid being produced.

The employment of settable resin-coated particulate solids to form a fluid-permeable barrier against detritus and unconsolidated earth materials from incompetent strata traversed by a well is widely practiced. The resin and particulate material are substantially insoluble or unreactive with both oil and water. The resin-coated solids are usually emplaced about the periphery of the wellbore by slurrying them in a suitable carrier liquid, e.g., a petroleum oil or aqueous solution, injecting the so prepared slurry into the well, thereby positioning the solids at the level desired, and allowing the resin to set in situ to form a unitary fluid-permeable mass of the particulate solids. Some heat is necessary to effect the setting of the resin. Such a resin-coated composition is described in U.S. Patent 2,823,753, said resin composition therein consisting of settable phenol-formaldehyde resin-coated walnutshell slurried in petroleum oil. An improved method of positioning the resin-coated solids is described in copending application S.N. 617,373, filed October 22, 1956, now U.S. Patent No. 2,941,594, wherein an especially designed, slotted liner assembly is employed.

The composition thus described is currently widely used in the treatment of wells and has successfully provided a filter means against the entrance of detritus into the wellbore of wells thus treated without adversely affecting a flow of fluids thereto.

A disadvantage of current practice has been the requirement that the resin-coated particulate solids be prepared, for slurrying in a carrier liquid, at or relatively near the site of the well to be treated.

In copending application, S.N. 766,703, filed simultaneously herewith, this disadvantage has been largely overcome. The said application describes a novel resin-coated particulate composition and method of preparation thereof, suitable for slurrying in a carrier liquid for emplacement in a well to form a fluid-permeable barrier against entrance of detritus into the wellbore, at a conveniently located and especially equipped central plant which may well be remote from the site of usage. The composition thus prepared may be stored and shipped as needed to the site of a well to be treated.

The settable resin composition employed in S.N. 766,703 illustrates a thermoplastic-thermosetting resin since it is a dry, hard solid at lower temperatures but when raised to a high temperature, it softens and forms a thermosetting resin. The resin is sometimes referred to as partially condensed or a Stage B resin. The resin composition of S.N. 766,703 retains its particulate condition below a temperature of 125° F., but when subjected to a temperature of at least 125° F., it softens and coalesces into a set rigid porous network.

A limitation of S.N. 766,703 is that the temperature of the well being treated must be at least 125° F. for the resin to soften and set and even at temperatures of 125° to 150° F., the lapse of time necessary for the resin employed to set is longer than is desired. Furthermore, wells which do have temperatures as high as 150° F. are often cooled, because of the amount of fluids employed in the treating operation, to a temperature below 125° F. and therefore, to effect the formation of the thermosetting porous network therein, the well has to be closed in for a time sufficient to allow the temperature of the wellbore and adjacent formation to rise to a temperature of at least 125° F.

The effect of lowering the wellbore temperature and the adjacent formation as a result of injecting large quantities of fluid into the well during treatment is particularly illustrated when a well is first fractured and then a fluid-permeable barrier is positioned in a well following the fracturing operation to retard or completely inhibit the back flow of propping sand employed in the fracturing operation because these operations require unusually large gallonages of fracturing fluids. It is not uncommon in a fracturing operation to cause a lowering of the temperature of a wellbore from the initial normal temperature of say, between 160° and 175° F. to something below 125° F. for a temporary period. The resin-coated shell composition prepared according to S.N. 766,703, of course, does not soften and set in situ after injection until the temperature again rises to at least 125° F.

The present invention is predicated upon the discovery that the incorporation of pelletized or fragmented or particulated metal, reactive with an acid, e.g., magnesium, zinc, aluminum or their alloys, into the composition prepared according to S.N. 766,703, to which a suitable amount of acid is added to react with the metal pellets, effectively raises the temperature of the composition when injected into a well to a point sufficiently high to soften and set the resin coated particulate material into a thermoset monolithic fluid-permeable mass.

Any metal reactive with an acid to produce heat may be employed. Magnesium is the preferred metal to employ. The size of the metal particles should be between 4 and 200 mesh and preferably, between 20 and 80 mesh. A preferred embodiment of the invention is to employ resin-coated particles and magnesium particles of roughly the same mesh size. The amount of pelletized or powdered metal to use should be between 3 and 20 percent by weight of the resin-coated particulate solids in the treating composition and preferably between 5 and 10 percent of the weight of such solids. Pelletized or atomized magnesium, e.g., that prepared according to Patents 2,676,359, 2,699,576 or 2,787,534, are particularly suitable for the practice of the invention.

Using magnesium as an illustration of the metal to employ, and hydrochloric as the acid, the following equation represents the reaction thought to take place to produce necessary heat for setting up the resin:

$$Mg + 2HCl \rightarrow H_2 + MgCl_2$$

The stoichiometry of the equation shows that the molecular weights involved are roughly 3 weight units of hydrogen chloride to 1 weight unit of magnesium.

Any mineral acid or organic acid yielding sufficient H ions in solution may be employed. Mineral acids include the common ones such as hydrochloric, sulfuric, nitric, and phosphoric. The organic acids include acetic and sulfonic acids. Mineral acids may be employed, having a concentration of between 3 and 31 percent by weight in water, and usually between 5 and 15 percent by weight. Hydrochloric acid is the preferred acid to employ. When hydrochloric acid is employed with magnesium, the following values, taken from the Handbook of Chemistry by Lange, show the volume of three commonly employed strengths of hydrochloric acid necessary to react with 1 pound of magnesium, i.e., provide the stoichiometric quantities of HCl and Mg.

| Strength of Acid | Grams HCl/ liter | Gallons of acid necessary to react with 1 lb. of Mg |
| --- | --- | --- |
| 5 percent HCl | 50 | 7.2 |
| 10 percent HCl | 104 | 3.4 |
| 15 percent HCl | 161 | 2.2 |

Bearing in mind that 1 gallon=3.785 liters and 1 pound=453.59 grams, any desired volume of acid can be readily calculated for any weight of magnesium. An excess of the acid over the stoichiometric amount necessary to react with the magnesium is recommended because a portion of the acid is diverted into the network of the composition, and, therefore, if no more than the stoichiometric amount of acid were employed, the reaction would be too slow or, due to lost acid, incomplete. Usually from 3½ to 5 times the stoichiometric quantity of acid is used, about 4.25 times being a preferred ratio. In practice, a corrosion inhibitor in an amount between 0.1 and 1.0 percent of the weight of the acid is usually added to the acid. Sodium arsenite is commonly employed for this purpose.

8,146 B.t.u. are calculated to be produced by 1 pound of magnesium reacted with 3 pounds of hydrogen chloride at an initial temperature of 77° F.

The materials which may be employed in the practice of the well treating operation described in Serial No. 766,703 are as follows:

The resins are those which ultimately polymerize or condense to a thermosetting resin but which at a stage of partial polymerization or condensation are thermoplastic. Resins having this combination of properties for the purpose of this invention are called thermoplastic-thermosetting. Such resins include phenol-aldehyde resins, epoxy resins, and alkyl or glyptal resins.

Intermediate or stage B phenol-formaldehyde resins or such resins copolymerized with resorcinol are the preferred resins to use. A stage B phenol-formaldehyde resin is sometimes referred to as resistol, in contrast to stage A resins referred to as resole and stage C resins as resite. A stage B phenol-formaldehyde resin in general possesses the following characteristics: (1) It is a second stage condensation product; (2) it is not soluble in alkali solvents; (3) it is little cross-linked; (4) it is hard and brittle while at room temperature or colder; (5) it can be softened by heat; and (6) it can be made a thermosetting resin.

Instead of formaldehyde, other aldehydes may be used but are considered less desirable. Among them are: acetaldehyde, furfural, butyraldehyde, chloral, and acrolein.

The particulate material employed in the invention may be any pulverulent material unreactive with the hot resin. Nutshell, brittle synthetic resins, gilsonite, coke, peach pits, or sand, which is pulverized to a mesh size of between 10 and 100 but preferably between 10 and 40 is usually used. Ground walnutshell of either a mesh size of between 10 and 20 or between 20 and 30 is the preferred particulate material to use.

The oil for use in slurrying the resin-coated particles is a petroleum oil, e.g., diesel oil, gas oil, kerosene, lubricating oil, or crude oil. The viscosity of the oil is not critical so long as the oil remains satisfactorily fluid. It is preferred that it have a viscosity of between 10 and 100 seconds Saybolt Universal at 100° F. and a pour point of not lower than 10° F. The flash point should be sufficiently high to reduce unnecessary fire dangers, a minimum flash point of 270° F. Pensky-Martin closed up, being recommended.

The ratio of the amount of particulate material to that of the liquid resin should be between 1 and 10 pounds of particulate material to 1 pound of liquid resin. When walnutshell, having a mesh size between 10 and 20 mesh is employed, the ratio of the amounts of such size walnutshell to that of the liquid resin is preferably between 4 and 8 pounds of the shell per pound of resin and preferably 6 pounds of shell per pound of resin. When the walnutshell employed has a mesh size of between 20 and 30, then the ratio is preferably between 1½ and 4½ pounds of shell to 1 pound of resin.

The resin-coated particulate composition thus prepared may be boxed or packaged and stored or shipped directly to a well-treating site. There it is admixed with a vehicle, preferably a gelled petroleum oil, but permissibly with any gelled or ungelled or even aqueous liquid for injection into the well. The ratio of the resin-coated composition to vehicle or oil for injecting into the well is not critical, a ratio of about ½ pound of resin per gallon of oil being usually employed. The gelled oil employed is usually either one made by forming a soap in situ in a petroleum oil or one prepared in accordance with U.S. application, Serial No. 692,727, filed October 28, 1957, wherein a gel concentrate is first made by reacting substantially stoichiometric quantities of a fatty acid having between 8 and 22 carbon atoms and an alkali metal hydroxide at the gelation temperature of the fatty acid employed and subsequently diluting the concentrate by the addition of more petroleum oil. Since the use of ground walnutshell and the intermediate stage phenol-aldehyde resin, or phenol-aldehyde-resorcinol resin, best illustrates the practice of the invention, the practice thereof will be described more fully employing such resin and walnutshell. The invention, however, is not to be construed as being limited thereto but to encompass the use of the resins and particulate material having the properties set out hereinabove and as defined in the claims.

In accordance with the invention, a phenol-formaldehyde resin may be prepared as follows:

A molar ratio of 1 mole of $C_6H_5OH$ to about 1.5 moles of HCHO with about 0.3 mole of hydrogen chloride added as a catalyst, usually at about a 32 percent by weight hydrochloric acid, are admixed in a reactor and heated at about 150° F. until the mixture becomes cloudy. An aqueous solution of NaOH, usually about 50 percent by weight, is then added to the reactor. The mixture thus produced then separates into an upper aqueous layer and a lower resinous layer having a pH of between 4.8 and 5.2 and a viscosity of between 700 and 950 centipoises and a density of about 9.9 pounds per gallon at 80° F. The resin is stable at normal temperature and pressure and may be stored for at least two months before use.

A phenol-formaldehyde-polyhydric phenol resin may be prepared as follows:

A molar ratio of 1 of $C_6H_5OH$ to about 1.5 of HCHO (calculated as 100 percent) is admixed in the presence of a base, e.g., NaOH in a reaction vessel at about 180° to 200° F. and at that temperature for from 1 to 2 hours, e.g., at about 200° F. for an hour. It is preferably cooked to a viscosity of 30 to 40 centipoises measured at 200° F. The pH of the resulting mixture is then lowered while continuing to mix to a pH value of between about 4 and 6 by the addition thereto of an acid, e.g., hydrochloric, whereupon the mixture separates into a lower layer comprising an acidic partially condensed phenol-formaldehyde resin and an upper layer of an aqueous salt solution which is consequently separated and discarded. To the partially condensed resin is added resorcinol in a molar ratio of about 1 mole of resorcinol to slightly over 1 mole of the phenol to form a phenol-aldehyde polyhydric phenol liquid resin. The resin can be kept at normal conditions for 2 months and longer before use, if desired.

Ground walnutshell of a mesh size of between 10 and 30 mesh, U.S. Standard sieve series, in a ratio of between 1.5 and 8 pounds per pound of resin, are admixed in a blender while continuing to heat at about 200° F. Although a temperature of from about 180° F. to 210° F. may be used it is recommended that it be controlled at 200±2° F. After about 5 minutes of mixing, the resin-walnutshell mixture is slurried in a mineral oil at a temperature of between 180° and 210° F. but preferably at about 200° F. in a ratio of from about 1 to 1½ pounds of the shell-resin mixture to 1 gallon of oil. The heating is continued at about 200° F. until shell particle samples removed therefrom and cooled to about 100° F. show no tackiness. A simple test to determine this lack of tackiness is to remove about a ½ pound sample of the 200° F. coated shell from the mixture, immerse it in about ⅓ gallon of oil at 80° F. (the temperature of the shell thereby being brought to about 100° F.) and then removing the thus-cooled resin coated sample of particles and examining them for tackiness. Cooking time for the resin-coated particles in the oil is usually from about ¾ to 1¼ hours.

The oil slurry of the coated particles is then cooked while continuing to agitate the slurry. The rate of cooling is not highly critical but a cooling rate of between 1° and 3° F. per minute down to about 150° F. is recommended. A decrease in temperature which is appreciably slower than that will result in over-cooking the slurry. The cooling is continued down to between about 110° and 100° F. and the oil then drained from the coated particle composition.

An examination of the particles at this point will show them to be coated with a hard film of resin. The thus-coated particles are then preferably passed through a crusher or roller mill to break up any agglomerates that may have formed. The crusher or roller is selected and adjusted to provide particles of a mesh size somewhat larger than that of the original particles to allow for the added thickness of the resin. For example, when 10-20 mesh walnutshell is used, the resin-coated particles are crushed so that they will pass readily through a number 8 mesh sieve. The coating on the particles will remain stable at any temperature below 85° F. but will soften when the temperature is raised to 125° F. or higher and thereafter a mass of the so coated particles will form a unitary thermosetting mass.

For use according to the invention, a composition was prepared according to S.N. 766,703, as follows:

STEP 1

390 pounds of phenol, 506 pounds of 37 percent by weight aqueous formaldehyde solution, and 50 pounds of 50 percent by weight NaOH aqueous solution were admixed in a reaction vessel and held at about 175° F. for about 2½ hours after which the admixture was acidified to a pH of 4 by adding 7.4 gallons of 32 percent by weight hydrochloric acid. As the acid was added, the mixture separated into 2 layers. The upper layer was about 38 percent by volume of the original mixture and comprised salt water. The lower layer was about 62 percent of the original mixture by volume and comprised a slightly acid partially condensed aqueous phenol-formaldehyde resin. This resin represented a molar ratio of phenol to formaldehyde of about 1.0 to 1.5.

To this was added, while agitating, 410 pounds of resorcinol which formed an aqueous partially condensed phenol-formaldehyde-resorcinol resin. This was a mole ratio of phenol to resorcinol of 1.0 to 0.9. This resin had a viscosity of 150 centipoises and a specific gravity of 1.23 at 80° F.

STEP 2

400 pounds of the phenol-formaldehyde-resorcinol resin prepared in Step 1 were placed in a 50 gallon jacketed kettle provided with a heating and stirring means. The resin was heated to 200° F. and held at that temperature until a viscosity of between 30 and 40 centipoises (measured at 200° F.) was obtained. The viscosity value was determined by employing a Brookfield viscometer using a number 1 spindle at 60 r.p.m. During the heating period, the resin was stirred. The heating period was approximately 1 hour.

STEP 3

1,172 pounds of 20 to 30 mesh walnutshell were placed in a 50 cubic foot helical ribbon blender which was situated for convenience under the jacketed mixing kettle. The 200° F. resin was added to the blender and mixing continued therein for a period of about 5 minutes. Both the heating period and the temperature control of this operation should be controlled for satisfactory results. If the resin is allowed to cool to less than about 180° F., the coating process will be very difficult due to the increased viscosity of the cooled resin. On the other hand, if the resin is allowed to remain at a temperature of 200° F. or higher for more than about 10 minutes after a viscosity of about 47 centipoises has been reached (measured at 200° F.), an excessive amount of resin will be retained on the shell particles due to the high viscosity resulting from prolonging the heating operation. Mixing times and temperatures between those extremes are desirably used.

STEP 4

2625 pounds of a mineral oil (about 350 gallons) having a viscosity of between 55 and 65 seconds Saybolt Universal at 100° F., a pour point of 10° F., a minimum Pensky-Martin closed cup flash point of 270° F., known as Condor No. 1000 Mineral Oil, were heated to 210° F. with agitation in a polymerization kettle provided with stirring and heating means. The contents of the polymerization kettle were held at about 200°±2° F. for about 1 hour. To determine when the polymerization process had advanced sufficiently, a ½ pound sample of the shell material was dipped from the polymerization kettle by means of a strainer and placed in one-third gallon of mineral oil at a temperature of about 80° F. in accordance with the test described above. When the shell particles, examined, were found not to be tacky nor exhibit a tendency to stick together, the process was considered complete. The contents of the polymerization kettle was then cooled at a rate of about 2° F. per minute down to 100° F. and the oil then drained off.

STEP 5

After the shell composition had cooled and the oil had thoroughly drained therefrom, it was removed from the kettle and passed through a 24-inch roller mill where it was crushed to a size such that all the particles passed readily through U.S. Standard sieve having a mesh size of 8. As they dropped through the sieve the particles were packaged. These particles can be described as an oil-slurried, plastic-coated walnut shell composition.

To show the effect of the pellets or particles of metal and acid on the temperature, 20 grams of the resin coated particulate composition prepared above were admixed with 0.8 gram of ZK60, 20–30 mesh, magnesium pellets and 52 grams of 15 percent hydrochloric acid in a glass container equipped with a thermometer. The temperature rose to 212° F. within a few seconds and the aqueous portion thereof began to boil. Calculations based upon conditions in a formation where the pressure is sufficient to prevent boiling indicate that the resin composition described above when admixed with 7½ percent by weight thereof of ZK60 pellets of 20–30 mesh size and at least the stoichiometric quantity of acid necessary to react with the magnesium would raise the temperature to 385° F. in the resin-coated composition.

The resin-coated, oil-slurried walnutshell composition thus prepared was subjected to a series of tests to show the effect on softening and setting the resin composition by the use of magnesium metal pellets and hydrochloric acid when the amounts thereof were varied. The tests were conducted by filling steel pipe sections, which were 2 feet long and 2 inches in inside diameter, with portions of the resin-coated shell composition which had been previously intermixed with 20–30 mesh magnesium pellets in the amounts set out in the table below. The pipe sections were placed in a vertical position. 80 mesh screens were placed at the lower ends of the pipe sections and the sections then capped at the lower end with a cap containing 6¼ inch holes more or less uniformly distributed therein. Hydrochloric acid in the strengths and amounts set out in the table below was pumped down through the mixture of resin-coated walnutshell and magnesium pellets at the rate of 21 gallons per minute and a pressure of 500 p.s.i. By referring to the amounts of acid employed, it can be seen that, at such high rate, the time required for the acid to pass through the resin-coated particulate solid mass was only a fraction of a minute. The mass was then left impregnated with the acid and set up immediately after stopping the flow. The acid contained 0.4 percent sodium arsenite as a corrosion inhibitor. The initial temperautre of the resin composition was 80° F.

The results obtained when from 2 to 31 percent by weight hydrochloric acid was employed with the resin-coated particulate solids contained from 2 to 20 percent Mg metal pellets are set out in the table below.

The preferred strength of acid to use is between 7.5 and 20 percent. The quantity of acid employed as aforesaid should provide at least the stoichiometric amount to react with the metal present and preferably between 3½ and 5 times the stoichiometric amount.

The emplacement of the composition of the invention including all the magnesium metal may be attained by the injection of all the composition in one operation followed by injection of conventional well-treating liquids to position the composition, and thereafter impregnating the composition with an acid. However, it is thought that better bridging may be attained by injecting the composition of the invention in two or more successive stages. Each stage, only some of the stages, or only the final stage may include the acid impregnating step.

The practice of the invention is illustrated by the following example:

EXAMPLE

A well in the Shreveport No. 4 District, Big Creek Pool, Richland County, Louisiana, was treated in accordance with the invention. The well extended through a pay zone between a level of 2604 and 2608 feet and had a total depth of 2625 feet. It was perforated with 4 shots per foot through the pay zone. It was cased with a 5½ inch casing and a 2½ inch tubing which extended for the purposes of the treatment to a depth of 2593 feet. The bottomhole temperature of the well was 120° F. and was therefore not sufficiently high to soften and set up the resin on the particles in the composition without the aid of heat from an outside source. The treatment of the well proceeded as follows:

The carrying liquid for the well treatment was prepared by placing 683 gallons of water in a 1000 gallon cylindrical mixing tank equipped with paddles. To the Table

[Effects on set of resin-coated oil-slurried particulate composition by variations in Mg pellets and HCl acid]

| Test No. | Resin-Coated Oil-Slurried Shell Composition In Grams | Magnesium Pellets, ZK60 Alloy [1] | | Hydrochloric Acid | | Compressive Strength (p.s.i.) |
|---|---|---|---|---|---|---|
| | | Grams | Percent Of Shell Composition | Amount In Gallons | Percent HCl In Water | |
| 1 | 966 | | | 1.0 | 15 | Did not set. |
| 2 | 947 | 19 | 2 | 0.4 | 15 | Do. |
| 3 | 937 | 29 | 3 | 1.0 | 10 | Do. |
| 4 | 937 | 29 | 3 | 0.6 | 15 | 100. |
| 5 | 918 | 48 | 5 | 1.0 | 15 | 900. |
| 6 | 894 | 72 | 7.5 | 1.5 | 15 | 1,000. |
| 7 | 869 | 97 | 10 | 2.0 | 15 | 1,100. |
| 8 | 773 | 193 | 20 | 4.0 | 15 | 820.[2] |
| 9 | 869 | 97 | 10 | 10.0 | 2 | Did not set. |
| 10 | 869 | 97 | 10 | 9.0 | 3 | 100. |
| 11 | 869 | 97 | 10 | 6.0 | 5 | 830. |
| 12 | 869 | 97 | 10 | 1.0 | 31 | 1,310. |

[1] ZK60: A magnesium-base alloy consisting essentially of 93 percent Mg, 6 percent Zn, and 0.2 percent Mn.
[2] Too porous to be used as a barrier against very fine sand.

The results set out in the table above show that the use of less than 3 percent magnesium pellets based on the weight of the resin-coated walnutshell composition did not result in a satisfactory set. It also shows that when as much as 20 percent magnesium pellets were employed the set composition tended to become too coarse to be employed as a barrier against the passage therethrough of fine sand. However, as much as 20 percent magnesium might be useful when only coarse sand is encountered. The table also shows that when magnesium metal is present in the required amount, the strength of the acid employed may be varied between 3 and 31 percent by weight.

water were added 30 pounds of guar gum which had previously been wet with 4.5 gallons of kerosene to prevent the material from balling up when added to the water. The kerosene-treated guar gum was stirred into the water for 15 minutes. A total of 690 gallons of carrying liquid were thus made.

The actual treatment of the well was preceded by the following preparatory treatment: a packer was positioned in the annulus between the tubing and casing near the end of the tubing substantially at the 2593 foot depth. The packer was closed and the annulus above the packer filled with water to prevent displacement of the packer upwardly when the well below the packer was subjected to pressure. Water was pumped down the tubing until it was filled and then 5.5 additional barrels of water pumped into the tubing over a period of another minute during which the pressure rose to 1350 p.s.i. This additional water showed that the formation would take fluid and could be treated.

The actual treatment of the well was conducted in three stages as follows:

The first stage consisted of admixing 444 gallons of the guar-thickened carrying liquid prepared as described above, 400 pounds of the oil-slurried, resin-coated walnutshell composition prepared as described above, and 16 pounds of pelletized magnesium. The magnesium metal was atomized ZK60 alloy (as defined in the footnote of the table, supra). It had the particle size, determined according to U.S. Bureau of Standard sieve series, set out below:

| Sieve Number Through Which Passed | Sieve Number On Which Retained | Percent Retained Thereon |
| --- | --- | --- |
| 10 | 20 | 0.8 |
| 20 | 40 | 32.3 |
| 40 | 60 | 52.4 |
| 60 | 80 | 13.6 |
| 80 | 100 | 0.2 |
| 100 | 200 | 0.2 |
| 200 | Pan | 0.5 |

The amount of treating solution prepared in the first stage was about 12 barrels. This was pumped down the tubing followed by 4 barrels of flush water. The volume of resin-coated walnutshell composition was calculated to be thereby positioned in the wellbore at the level opposite the pay zone. Now 14 additional barrels of flush water were pumped down forcing the 12 barrels of walnutshell composition into a zone roughly defined by the periphery of the wellbore and the adjacent formation.

The second stage of the treating procedure consisted of mixing in a second tank 192 gallons of the guar-thickened water carrier liquid, 400 pounds of the oil-slurried, resin-coated walnutshell composition and 16 pounds of pelletized magnesium, all of the type used in the first stage. This amount was about 6 barrels (252 gallons). The fluid thus prepared was pumped down the tubing and positioned opposite the pay zone. 16 barrels of flush water were then pumped down the tubing which forced the walnutshell composition into a zone of the formation which might be roughly described as the periphery of the wellbore.

The treating acid was then prepared by admixing 291.5 gallons of a 15 percent by weight hydrochloric acid, 2 gallons of sodium arsenite solution (prepared by admixing 4 pounds of arsenic trioxide and 1 pound of sodium hydroxide in 25 pounds of water) and 0.5 gallon of a polyglycol prepared by condensing 1 mole of di-secondary-butylphenol and 10 moles of ethylene oxide. The sodium arsenite is a corrosion inhibitor and the glycol is a surfactant. 168 gallons of the acid solution thus prepared were pumped down the tubing followed by 18 barrels of lease crude oil flush to force the acid solution through the walnutshell composition. The acid solution was there caused to contact and hence to react with the magnesium pellets producing heat to set up the resin-coated shell composition about the wellbore.

The third and last stage of the treatment was carried out by admixing 200 pounds of the resin-coated walnutshell, 8 pounds of the magnesium pellets, and 54 gallons of the water-guar gum vehicle employed in the first and second stages of the treatment. This amount, which was about 2 barrels of fluid, was pumped down the tubing followed by 2 barrels of lease crude oil flush. 3 barrels of the acid solution employed in the first and second stages were then pumped down the tubing followed by 18 barrels of lease crude oil as a flush. The resin-coated composition containing the magnesium now extended upward to a level about 5 feet above the perforations in accordance with accepted practice in positioning such barriers to prevent sand and the like being carried into the wellbore from points above the barrier.

Since the resin-coated composition containing the magnesium pellets sets to a unitary mass almost immediately after contact with the acid, it was not necessary to close the well in for any period of time. As soon as the treating equipment could be removed, the well was put back into production. Shortly thereafter, the well was shut down and the pump and system examined. It was found that the walnutshell composition containing the magnesium had set up to a hard fluid-permeable mass of sufficiently fine porosity to serve as a barrier against the passage therethrough of fine sand. The well was again put back into production and after 53 days was averaging between 25 and 35 barrels of oil per day with no sand.

An examination of the example shows that the particulate solid of S. N. 766,703, when admixed with pelletized magnesium and an acid in accordance with the present invention, sets up to a hard, resistant fluid-permeable sand barrier in wells. The invention has particular application in treating wells which have temperatures which are too low to cause the resin to set up without heat from an outside source. The high production of the well of the example without accompanying sand shows the effectiveness of the barrier produced.

Having described the invention, what is claimed and desired to be protected by Letters Patent is:

1. A composition for admixture with an acid in situ to provide a fluid-permeable barrier in an oil well consisting of (1) a resin-coated particulate material prepared by heating a mixture consisting of a partially condensed thermoplastic-thermosetting resin and a particulate material inert to said resin having a particle size of between 10 and 100 mesh at a temperature between 120° and 250° F. until a viscosity of between 30 and 40 centipoises as measured at 200° F. is attained, slurrying said admixture with a petroleum oil at a temperature between 180° F. and 210° F. until the resin forms a dry, hard coating on the particles upon being cooled to room temperature, (2) between 3 and 20 percent by weight of said resin-coated particulate composition of a 4 to 100 mesh particulate metal selected from the class consisting of magnesium, zinc, and aluminum and, (3) a fluid vehicle selected from the class consisting of petroleum oil and water in an amount sufficient to form a pumpable slurry.

2. The composition for admixture with an acid to provide a fluid-permeable barrier in a well consisting of (1) a material formed by heating an admixture consisting of a stage B phenolic type resin and a 10 to 40 mesh particulate material inert to said resin at a ratio of 1 pound of the resin to between 1 and 10 pounds of the particulate material at a temperature of 180° and 210° F. until a viscosity of between 30 and 40 centipoises measured at 200° F. has been attained, slurrying said mixture at a temperature of between 180° and 210° F. with a petroleum oil having a viscosity of between 10 and 100 seconds Saybolt Universal measured at 100° until said resin forms a dry, hard coating on said particulate material upon being cooled to room temperature, cooling the oil-slurried mixture to room temperature, draining off substantially all the oil from said mixture, reducing the size of the individual particles of said mixture to not over about 8 mesh, (2) pelletized magnesium metal of between 4 and 200 mesh in an amount between 5 and 10 percent based on said particulate resin-coated material, and (3) a carrier vehicle selected from the class consisting of petroleum oil and aqueous solutions in an amount sufficient to form a pumpable slurry.

3. The composition of claim 2, wherein said particulate material is ground walnutshell of a particle size between 10 and 30 mesh, said pelletized magnesium is of a particle size between 10 and 30 mesh, and said fluid vehicle is water gelled with guar gum.

4. The method of treating an oil well consisting of injecting down the wellbore of the well the composition of claim 1, contacting said composition in situ with at least the stoichiometric amount of an acid necessary to react with the metal present, retaining the composition thus contacted in place until the resin has set to a continuous rigid porous network, and putting the well back into production.

5. The method of emplacing a fluid-permeable barrier to detritus entering a wellbore of a well penetrating an incompetent formation consisting of the steps of (1) heating at a temperature of between 180° and 210° F., a mixture of a partially condensed thermoplastic-thermosetting resin and 10 to 40 mesh particulate material inert to said resin in a ratio of 1 pound of resin to between 1 and 10 pounds of the particulate material until said resin has a viscosity of between 30 and 40 cps. measured at 200° F., slurrying said mixture at a temperature between 180° F. and 210° F. with a petroleum oil having a viscosity of between 10 and 100 seconds Saybolt Universal measured at 100° F. until said resin forms a dry, hard coating on said particulate material upon being cooled to room temperature, cooling the oil-slurried mixture to room temperature, draining off substantially all the oil from said mixture, and reducing the sizes of the independent particles of said mixture to not over about 8 mesh; (2) admixing with said resin-coated, oil-slurried particulate solids, a particulate metal selected from the class consisting of Mg, Zn, and Al of about the same mesh size as the particulate resin-coated solids, (3) positioning said mixture of resin-coated solids and particulate metal about the wellbore at the level of the incompetent formation, (4) injecting down said wellbore and into said mixture a mineral acid of a strength of between 3 and 31 percent by weight in sufficient amount to provide between 3½ and 5 times the stoichiometric quantity thereof necessary to react with the metal, and (5) allowing the resin-coated particles to set to a unitary rigid porous mass to provide a barrier against the entrance of detritus from said formation into the wellbore.

6. In the method of providing a fluid-permeable barrier to detritus entering a wellbore of a well penetrating an incompetent formation wherein an oil-slurried particulate solid material precoated with a settable resin which is substantially hard and dry at below about 125° F. but which softens and sets to a thermosetting resin when heated above 125° F. is injected down said wellbore and positioned at the level of the incompetent formation, the improvement consisting of admixing with said particulate solid material, magnesium pellets of between 4 and 200 mesh, prior to the injection and positioning of said oil-slurried particulate solid material, and subsequent to said injection and positioning, permeating said solids in position with at least 3 times the stoichiometric quantity of a 3 to 31 percent by weight mineral acid necessary to react completely with said magnesium pellets.

References Cited in the file of this patent

UNITED STATES PATENTS

| 2,294,294 | Grebe | Aug. 25, 1942 |
| 2,815,815 | Hower et al. | Dec. 10, 1957 |
| 2,823,753 | Henderson et al. | Feb. 18, 1958 |
| 2,846,390 | Lummus et al. | Aug. 5, 1958 |